United States Patent [19]
Buhler

[11] 3,909,106
[45] Sept. 30, 1975

[54] INCLINED PRISM OCULAR SYSTEMS FOR STEREOMICROSCOPE

[75] Inventor: Rato Buhler, Brimfield, Mass.

[73] Assignee: Applied Fiberoptics Incorporated, Southbridge, Mass.

[22] Filed: Mar. 19, 1974

[21] Appl. No.: 452,507

[52] U.S. Cl. .................... 350/35; 350/36; 350/49; 350/51
[51] Int. Cl.² .......................................... G02B 21/22
[58] Field of Search .................. 350/35, 36, 49, 51

[56] References Cited
UNITED STATES PATENTS

| | | |
|---|---|---|
| 2,660,090 | 11/1953 | Leitz et al............................ 350/35 |
| 2,901,943 | 9/1959 | Tackaberry.......................... 350/36 |
| 3,173,984 | 3/1965 | Vogl................................. 350/35 X |
| 3,704,932 | 12/1972 | Schick ................................. 350/35 |
| 3,776,614 | 12/1973 | Kloots et al.......................... 350/35 |

*Primary Examiner*—David H. Rubin
*Attorney, Agent, or Firm*—Thomas N. Tarrant

[57] ABSTRACT

An inclined binocular tube using a combination of Schmidt and rhomboid prisms for the optical erecting system.

5 Claims, 7 Drawing Figures

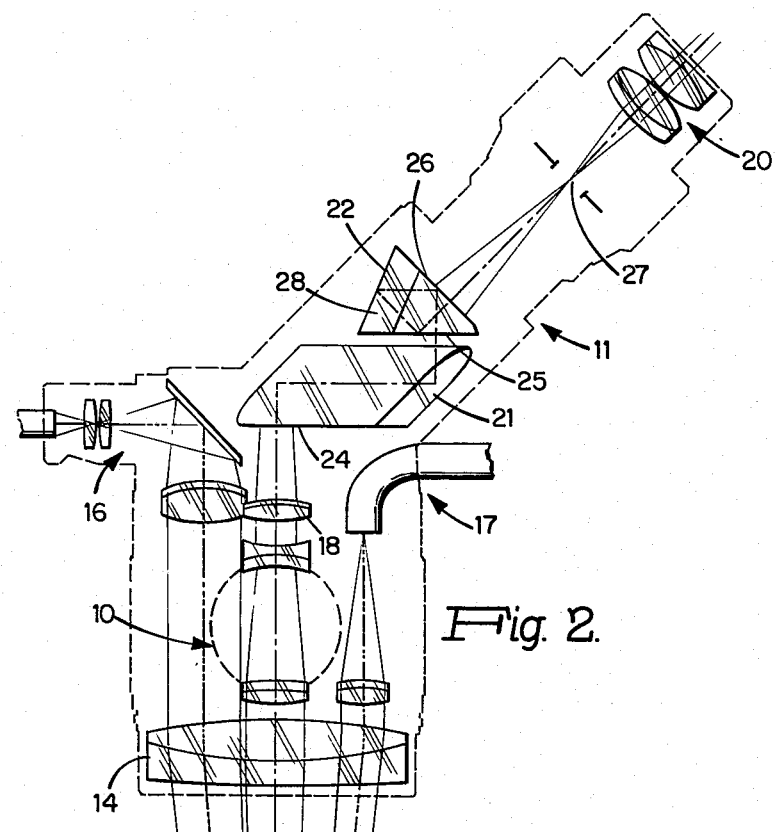
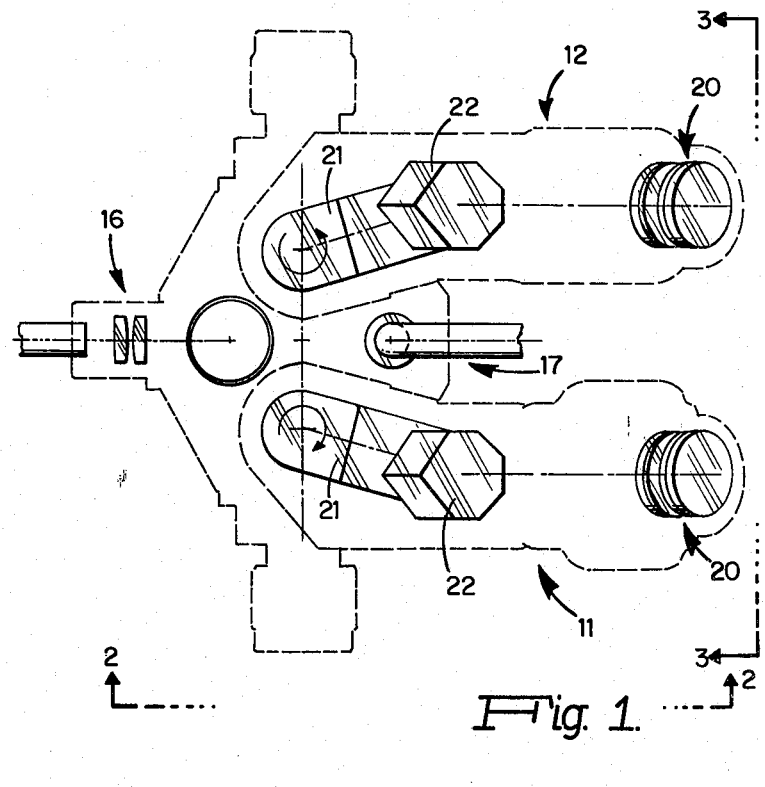

INCLINED PRISM OCULAR SYSTEMS FOR STEREOMICROSCOPE

BACKGROUND OF THE INVENTION:

1. Field of the Invention

The invention relates to inclined optical erecting systems for inclined tubes of binocular microscopes.

2. Description of the Prior Art

The present invention is an outgrowth of a longviewing-distance medical microscope disclosed in U.S. Pat. No. 3,776,614 assigned to the assignee of the present invention.

The ocular tubes of that microscope are noninclined and it was desired to provide inclined ocular tubes as a direct replacement of the noninclined tubes. The existence of auxillary optical systems between the ocular tubes increased the difficulty.

In order to keep ocular tubes short, binoculars commonly employ two porro prisms to fold the path. To provide an incline in the ocular tubes with respect to the objective optical axis, an angle adapter is sometimes provided between the main body and the ocular tubes. Most inclined oculars are longer and considerably more bulky than the noninclined type. Direct adaptation of inclined ocular tubes to a main body designed for straight tubes is usually difficult due to physical layout and the necessity of maintaining image sense and optical path length. Adding optical components for this purpose increases expense and alignment complexities.

SUMMARY OF THE INVENTION

By replacing the two porro prisms commonly found in prism binoculars with a combination of one rhomboid and one Schmidt prism, a particularly compact inclined system is provided in which the prism system for each ocular utilizes four plane reflecting surfaces and one "roof." The Schmidt prism is traversed four times in this arrangement giving a long optical path length relative to the prism size. The bottom surface of the rhomboid prism faces the tube objective in parallel relation, the Schmidt prism has one of its two larger surfaces facing the top of the rhomboid prism in parallel relation and the other large surface of the Schmidt prism faces the eyepiece in parallel relation. Using a 45° rhomboid and a Schmidt prism, this places the optical axis of the eyepiece at a 45° angle with respect to the optical axis of the tube objective.

The physical geometry of these two prisms utilized in this manner lines up with the ocular axis so that the invention also provides relatively straight uncluttered ocular tubes set at the angle of the ocular axis with respect to the objective axis.

Thus it is an object of the invention to provide a novel erecting system for binoculars;

It is a further object of the invention to provide a compact, folded, inclined erecting system for binoculars;

It is a further object of the invention to provide an inclined erecting system for binoculars using one rhomboid and one Schmidt prism;

It is a further object of the invention to provide a combination of erecting prisms in binoculars giving inclined oculars and lining up in physical outline with ocular tubes set at the inclined angle;

Still a further object of the invention is to provide a novel stereoscopic microscope with a single final objective lens, compact inclined oculars and provision for additional optical systems facing the objective lens.

Further objects and features of the invention will become apparent upon reading the following description together with the drawing.

BRIEF DESCRIPTION OF THE DRAWING:

FIG. 1 is a diagrammatic plan view of the inventive erecting system in a long-viewing-distance stereomicroscope.

FIG. 2 is a side elevation of FIG. 1.

Figure 3:
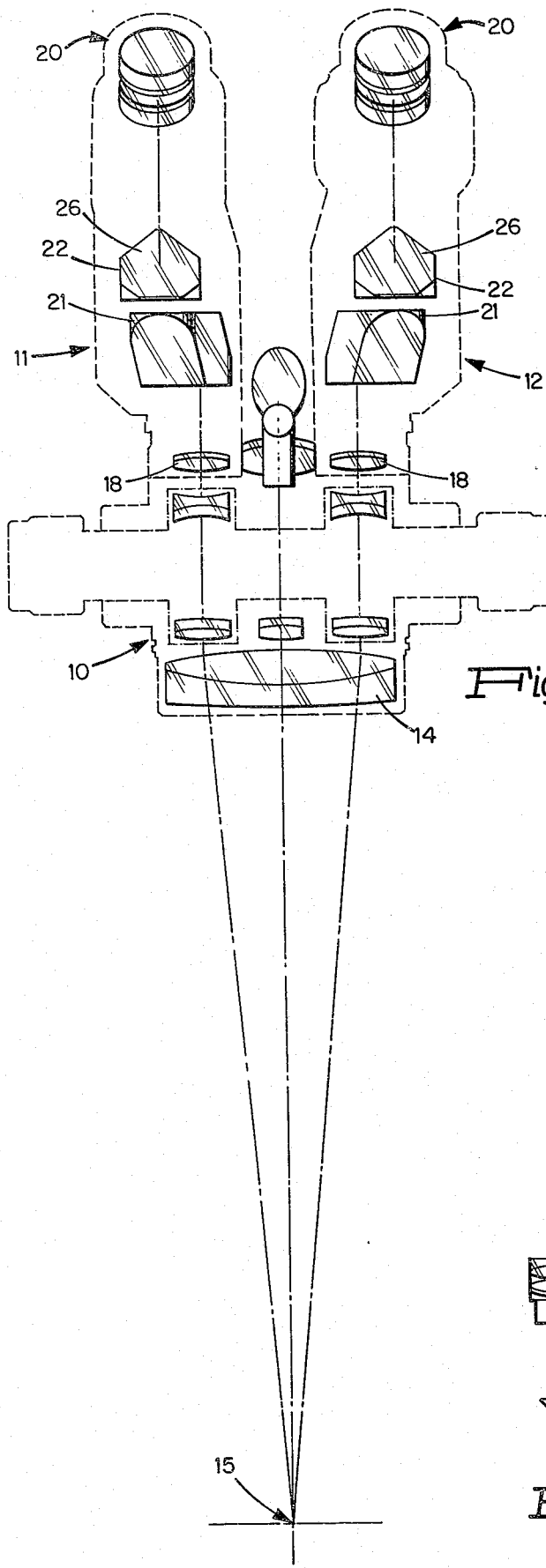
FIG. 3 is a rear elevation of FIG. 1.

DESCRIPTION OF THE PREFERRED EMBODIMENT:

The inventive inclined optics are best described in a complete stereoscopic microscope system. FIGS. 1, 2 and 3 show the optical components in diagrammatic fashion. The system depicted is that disclosed in U.S. Pat. No. 3,776,614 with the addition of magnification changer 10 and inclined ocular systems 11 and 12. Generally, as depicted in FIGS. 1 and 2, there are main objective lens 14 having focal point 15, Galilean magnification changer 10, and two ocular systems 11 and 12. This microscope also has provision for fiber-optic illuminating system 16 and coherent fiber-optic remote imaging system 17. Illuminating system 16 and remote imaging system 17 both face main objective lens 14 in parallel with ocular systems 11 and 12.

Ocular system 11 comprises tube objective 18, eyepiece 20 and a prismatic system comprising rhomboid prism 21 and Schmidt prism 22. Rhomboid prism 21 is a 45° rhomboid for displacing the line of sight without affecting the image orientation or deviating the line of sight. A Schmidt prism as used herein is defined as a prism having two sides forming a 45° angle facing a 90° "roof," formed by two further sides, the ridge of the "roof" being perpendicular to the ridge produced by the two sides forming the 45° angle. This Schmidt prism will revert and invert an image while simultaneously deviating the line of sight through 45°. This Schmidt prism is further detailed in DOD MIL-HDBK-141 dated Oct. 5, 1962 at para. 13.10.8 p. 13–32.

Referring to FIG. 2, it can be seen that rhomboid prism 21 is positioned so that side portion 24 adjacent a 45° angle is positioned in spaced proximity to tube objective 18 and is parallel therewith. Side portion 24 is considered a portion of the bottom surface of prism 21. Prism 22 is positioned in spaced proximity to the top surface of prism 21. The 45° angle of prism 22 is positioned proximate to the upper 45° angle of prism 21 with the top surface of prism 21 parallel with one side 25 forming the 45° angle of prism 22. The other side 26 forming the 45° angle of prism 22 faces and is parallel to eyepiece elements 20. Focal point 27 of tube objective 18 falls between eyepiece 20 and side 26 of prism 22. Thus it will be seen in FIG. 2 that with respect to light reflected from the vicinity of focal point 15, portion 24 is an entrance surface of prism 21, side 25 is an entrance surface of prism 22 in spaced proximity to an exit surface of prism 21 and side 26 is an exit surface of prism 22.

The sizes of prisms 21 and 22 are selected to control the optical pathlength relative to the physical length of the ocular system. In the particular microscope described, the prisms were selected to provide an identical intraprism pathlength to that provided by porro prisms in a noninclined occular system used with the same microscope body as will be further described relative to FIGS. 6 and 7.

Ocular systems 11 and 12 are each rotatable about the optical axes of their respective tube objectives. As the eyepieces are swung away from each other, there is line-of-sight convergence. The ocular tubes are arranged to provide parallel line-of-sight for the two eyes of a person who has the smallest eye separation to which the instrument may be adjusted. Increasing line-of-sight convergence results for viewers with increasing eye separation. In a stereomicroscope this has been found desirable. When a person is looking in the far field of his vision his eyesight is parallel, no triangulation data is obtained and there is an absence of stereopsis. Stereopsis is customary only in the near field where there is substantial line-of-sight convergence. Particularly with the novitiate, stereopsis has thus been achieved much more quickly using a stereomicroscope with some line-of-sight convergence.

Magnification changer 10 is a pair of Galilean telescope optics, one for each ocular system. Magnification changer 10 is rotatable 180° by knobs 30 (FIGS. 4 and 5) to increase or decrease magnification. It can also be rotated 90° in which case the object light passes between the telescope lenses with no magnification change at all. The advantage of the Galilean telescope optics in this arrangement is that object light focused at infinity by object lens 14 is still focused at infinity after passing through the Galilean telescope optics in either direction.

Referring again to FIG. 2, it can be seen that light from focal point 15 (object) is focused to infinity by object lens 14. Tube objective 18 focuses some of the light from object lens 14 at focal point 27. This light passing through tube objective 18 is twice reflected at right angles by prism 21 displacing the line-of-sight. It then passes vertically upward through side 25 of prism 22 and is again reflected at a right angle by side 26 onto prism roof 28. "Roof" 28 in prism 22 reflects this image light down to side 25 of the prism. Side 25 then reflects the image light out through side 26 at an angle 45° off from the optical axis of the objective lens system and through eyepiece 20.

Figure 4:
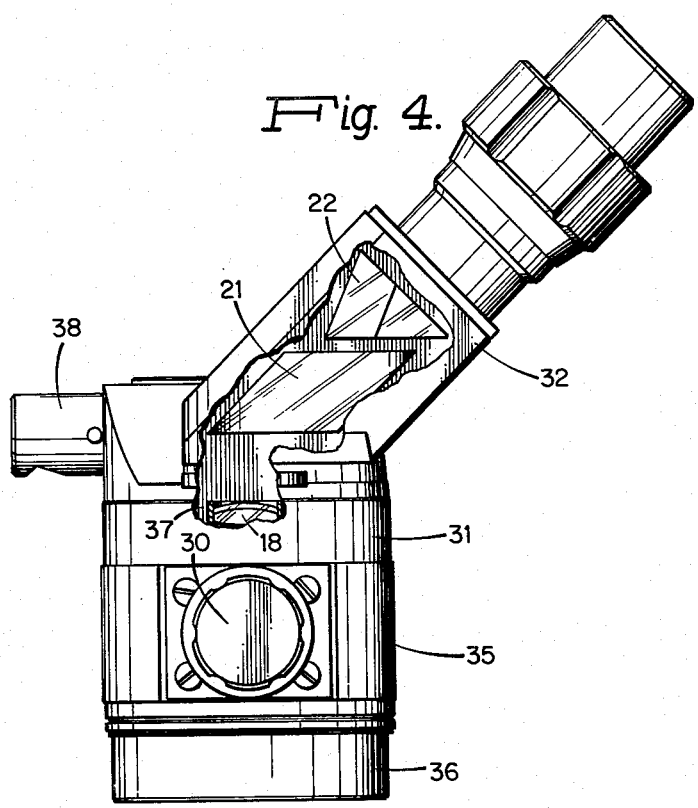
FIG. 4 is a side elevation partially cut-away of the microscope shown diagrammatically in FIGS. 1–3.
Figure 5:
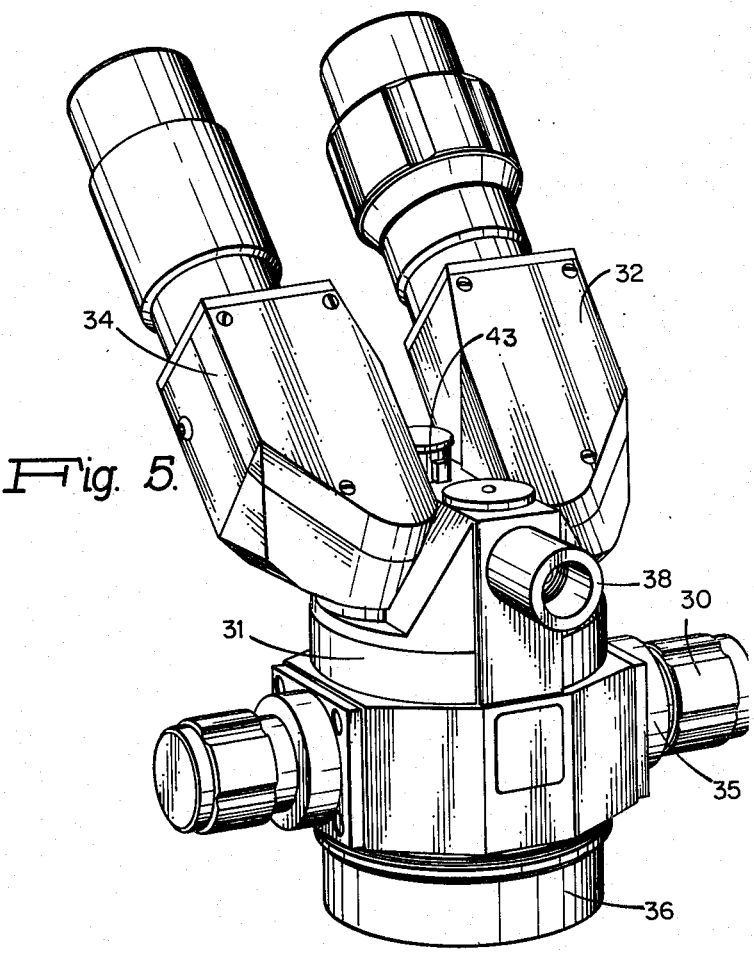
FIG. 5 is a view in perspective of the microscope of FIG. 4.

The microscope housing is shown in FIGS. 4 and 5 in side and front views respectively. Main body 31 supports two ocular tubes 32 and 34 on its upper surface. Changer housing 35 for magnification changer 10 is mounted to the bottom of body 31 and holder 36 for main objective lens 14 is mounted to the bottom of changer housing 35. As can be seen in a cutaway portion of FIG. 4, portion 37 of ocular tube 32 extends into body 31 along with tube objective 18. This portion 37 is gear linked (not shown) to the corresponding portion of tube 34 maintaining symmetrical movement of tubes 32 and 34.

Prisms 21 and 22 are depicted in a cutaway portion of tube 32 to illustrate the way this prism system lines up with the tube in a compact manner. Connector 38 serves to connect the microscope to a supporting structure. The fiber-optics illuminating system 16 is connected coaxially through connector 38. Connector 43 showing in FIG. 5 is for connection of remote image system 17.

Figures 6, 7:
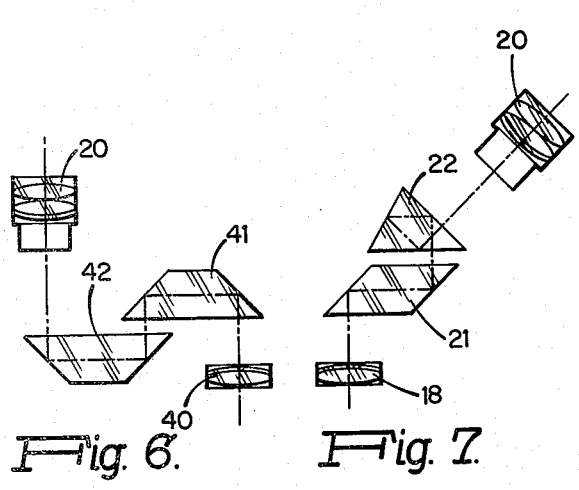
FIG. 6 is a diagrammatic illustration of a prior art porro prism erecting system.
FIG. 7 is a diagrammatic illustration of an inclined erecting system interchangeable with the porro prism system of FIG. 6.

It is a particular feature of the inventive ocular system that it facilitates the design of inclined and noninclined ocular systems fitting the same microscope body. FIGS. 6 and 7 are diagrammatic illustrations showing the interchangeability of the noninclined and inclined ocular systems. It is to be noted in these figures that the optical pathlength traversed within the prisms is identical for both systems. In the noninclined system of FIG. 6, tube objective 40 passes image light successively through two porro prisms 41 and 42 arranged in a common binocular configuration. The image light leaving prism 42 passes to eyepiece 44. Tube objectives 18 and 40 are identical as are eyepieces 20 and 44. Likewise the spacing of the lenses from the respective optically adjoining prism faces is suitably identical. It will be recognized that when the non-inclined system of FIG. 6 is mounted with lens 40 within body 31 (FIGS. 4 and 5), prism 42 is outboard of body 31 and extends below the top surface of body 31. Although it is contemplated that the interchangeability described above may be extended to the field, it is presently primarily a production advantage. The main microscope bodies are made alike and then either inclined or straight oculars are added in assembly as desired.

While the invention has been described with relation to a specific embodiment, there is no intention of being limited thereby, but rather it is the intention to cover the various aspects and variations encompassed within the scope of the appended claims.

I claim:

1. A stereomicroscope with a compact arrangement of inclined oculars together with illuminating and remote imaging optical systems comprising:
   a. a body having objective lens means;
   b. a top on said body facing said objective lens means for mounting ocular tubes;
   c. a pair of inclined ocular systems mounted side-by-side on said top, each comprising an ocular tube having an inclined axis and containing:
      1. an eyepiece;
      2. a rhomboid prism having an entrance surface and an exit surface for displacing the line of sight without affecting image orientation or deviating the line of sight; and,
      3. a Schmidt prism having six surfaces including an entrance surface, an exit surface forming a substantially 45° angle with said entrance surface, and two further surfaces meeting at a 90° angle to form a roof, the ridge of the roof facing and substantially perpendicular to the ridge produced where entrance and exit surfaces meet at said substantially 45° angle, said rhomboid and Schmidt prisms arranged so that the entrance surface of said rhomboid prism faces said objective lens means, the exit surface of said rhomboid prism faces the entrance surface of said Schmidt prism in parallel spaced adjacency and the exit surface of said Schmidt prism faces said eyepiece, the two prisms being lined up compactly along the inclined axis of said ocular tube thereby providing two plane reflections in the rhomboid prism and two plane and one roof reflection in the Schmidt prism, the roof reflection being in an optical path aligned on the roof ridge; and, d. illuminating and remote imaging optical systems connected on said top at front and rear positions between said ocular systems whereby four optical systems face said objective lens means in a substantially circular orientation.

2. A stereomicroscope according to claim 1 wherein said eyepiece has an optical axis perpendicular to a facing surface of said Schmidt prism and said objective lens means has an optical axis perpendicular to a facing surface of said rhomboid prism.

3. A stereomicroscope according to claim 2 wherein said eyepiece is positioned with its optical axis at an angle of 45° relative to the optical axis of said objective lens means.

4. A stereomicroscope according to claim 1 wherein said body is adapted to accept either inclined or noninclined ocular systems and said inclined ocular systems each utilize prisms having a combined internal optical path equal to the combined internal optical path of two porro prisms used in each ocular tube of noninclined ocular systems fitting said body.

5. A stereomicroscope according to claim 1 wherein said rhomboid prisms are 45° prisms.

* * * * *